(12) United States Patent
Zähe

(10) Patent No.: US 11,274,752 B2
(45) Date of Patent: Mar. 15, 2022

(54) FLOW CONTROL VALVE WITH LOAD-SENSE SIGNAL GENERATION

(71) Applicant: Sun Hydraulics, LLC, Sarasota, FL (US)

(72) Inventor: Bernd Zähe, Sarasota, FL (US)

(73) Assignee: Sun Hydraulics, LLC, Sarasota, FL (US)

(*) Notice: Subject to any disclaimer, the term of this patent is extended or adjusted under 35 U.S.C. 154(b) by 205 days.

(21) Appl. No.: 16/736,892

(22) Filed: Jan. 8, 2020

(65) Prior Publication Data

US 2021/0207725 A1    Jul. 8, 2021

(51) Int. Cl.
| | |
|---|---|
| *F16K 11/065* | (2006.01) |
| *F16K 11/07* | (2006.01) |
| *F15B 13/04* | (2006.01) |
| *F15B 13/044* | (2006.01) |
| *F16K 31/06* | (2006.01) |

(52) U.S. Cl.
CPC ........ *F16K 11/0716* (2013.01); *F15B 13/044* (2013.01); *F15B 13/0416* (2013.01); *F16K 31/0613* (2013.01); *F15B 2013/0448* (2013.01); *F15B 2211/30525* (2013.01);
(Continued)

(58) Field of Classification Search
CPC ............. F16K 11/0716; F16K 31/0613; F15B 13/0416; F15B 13/044; F15B 2013/0448; F15B 2211/30525; F15B 2211/3105; F15B 2211/327; F15B 2211/35; F15B 2211/6057
USPC ............... 137/625, 106, 487, 485, 490, 491, 137/565.14, 565.19, 625.12, 625.61, 137/625.69; 60/327, 461; 91/436
See application file for complete search history.

(56) References Cited

U.S. PATENT DOCUMENTS

| | | | | |
|---|---|---|---|---|
| 4,028,889 A | * | 6/1977 | Budzich | F15B 11/0445 |
| | | | | 60/420 |
| 4,531,449 A | * | 7/1985 | Reith | F15B 11/003 |
| | | | | 91/420 |

(Continued)

FOREIGN PATENT DOCUMENTS

| | | |
|---|---|---|
| DE | 10 2009 011303 A1 | 9/2010 |
| EP | 1 710 446 A2 | 10/2006 |
| WO | WO 2009/000472 A1 | 12/2008 |

OTHER PUBLICATIONS

International Search Report and Written Opinion prepared by the European Patent Office in International Application No. PCT/US2021/012139 dated Apr. 21, 2021.

*Primary Examiner* — Minh Q Le
(74) *Attorney, Agent, or Firm* — McDonnell Boehnen Hulbert & Berghoff LLP

(57) ABSTRACT

An example valve includes a first port fluidly coupled to a source of fluid, a second port fluidly coupled to an actuator, a third port fluidly coupled to a reservoir, and a fourth port configured to export a load-sense (LS) fluid signal. The valve can operate in: a neutral state, wherein fluid is allowed to flow from the second port to the third port, while the first port and the fourth port are blocked; a first actuated state, wherein fluid flow is throttled from the second port to the third port, while the first port and the fourth port remain blocked; or a second actuated state, wherein fluid flow from the second port to the third port is blocked, while fluid flow is allowed from the first port to the second port and from the second port to the fourth port.

20 Claims, 7 Drawing Sheets

(52) U.S. Cl.
CPC . *F15B 2211/3105* (2013.01); *F15B 2211/327* (2013.01); *F15B 2211/35* (2013.01); *F15B 2211/6057* (2013.01)

(56) References Cited

U.S. PATENT DOCUMENTS

| | | | |
|---|---|---|---|
| 6,196,247 B1 | 3/2001 | Knoell et al. | |
| 6,216,456 B1* | 4/2001 | Mitchell | E02F 9/2217 417/212 |
| 6,267,041 B1* | 7/2001 | Skiba | F15B 11/024 91/436 |
| 6,286,412 B1* | 9/2001 | Manring | E02F 9/2228 91/433 |
| 8,499,552 B2* | 8/2013 | Kauss | F15B 11/0445 60/327 |
| 2003/0115866 A1* | 6/2003 | Price | F15B 21/087 60/431 |
| 2005/0132876 A1* | 6/2005 | Pollet | F15B 13/0807 91/450 |
| 2005/0204735 A1* | 9/2005 | Sugano | F15B 11/167 60/452 |
| 2008/0087163 A1* | 4/2008 | Brickner | E02F 3/432 91/369.2 |
| 2009/0224192 A1* | 9/2009 | Oikawa | F16K 11/0716 251/129.15 |
| 2010/0308244 A1* | 12/2010 | Oikawa | F16K 31/0675 251/129.15 |
| 2016/0290523 A1* | 10/2016 | Kenkel | F15B 19/002 |
| 2018/0080196 A1* | 3/2018 | Kondo | E02F 9/2285 |
| 2019/0309771 A1* | 10/2019 | Peterson | F15B 13/024 |
| 2020/0393855 A1* | 12/2020 | Zahe | F15B 13/029 |
| 2020/0393856 A1* | 12/2020 | Zahe | F15B 13/0435 |
| 2021/0131582 A1* | 5/2021 | Ogasawara | F16K 11/0712 |

* cited by examiner

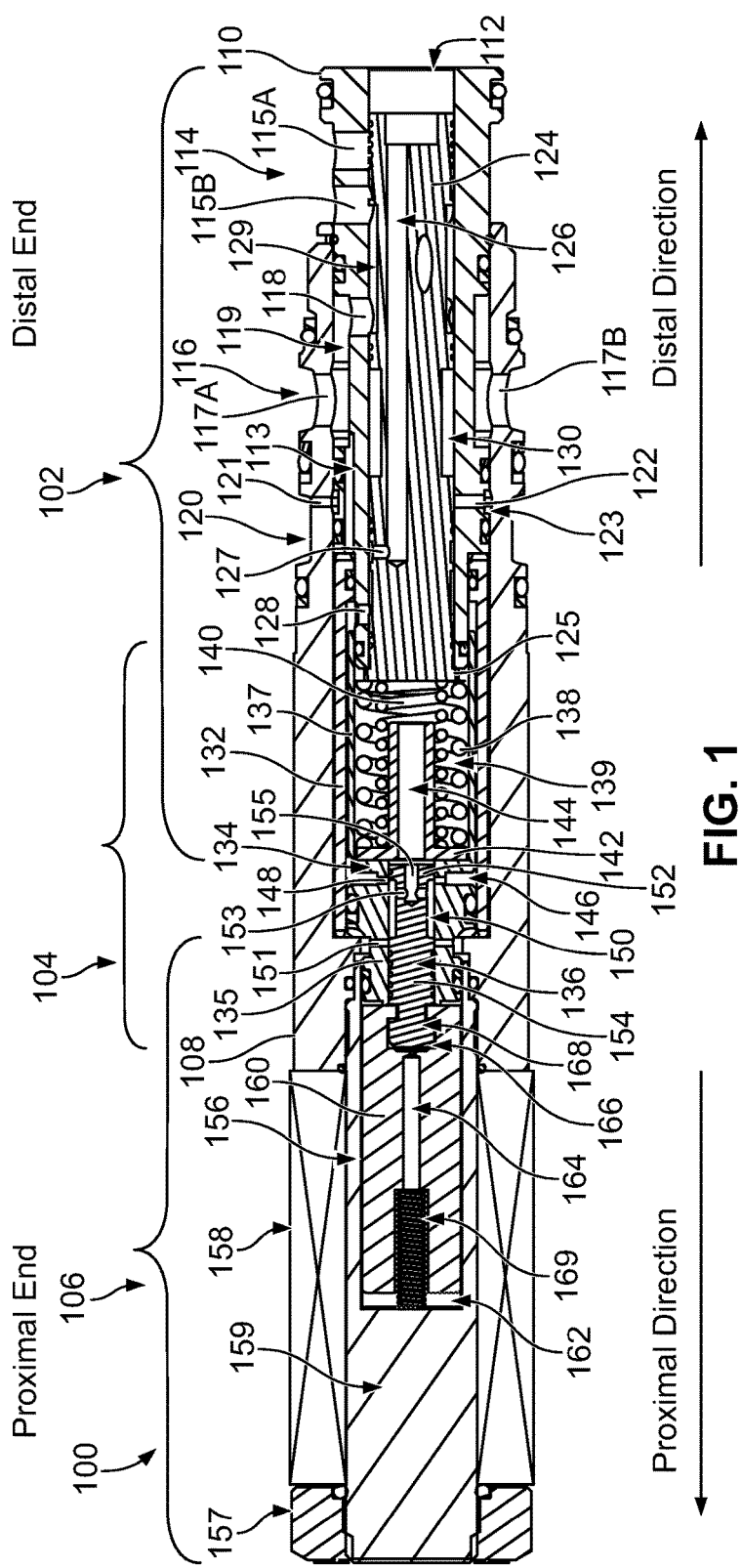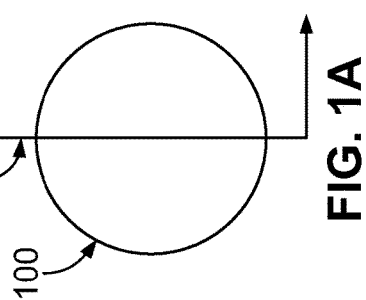

700

702 — OPERATING A VALVE IN A NEUTRAL STATE, WHEREIN THE VALVE COMPRISES A PLURALITY OF PORTS INCLUDING: A FIRST PORT CONFIGURED TO BE FLUIDLY COUPLED TO A SOURCE OF FLUID, A SECOND PORT CONFIGURED TO BE FLUIDLY COUPLED TO AN ACTUATOR, A THIRD PORT CONFIGURED TO BE FLUIDLY COUPLED TO A RESERVOIR, AND A FOURTH PORT CONFIGURED TO EXPORT A LOAD-SENSE FLUID SIGNAL FROM THE VALVE, WHEREIN WHEN THE VALVE IS IN THE NEUTRAL STATE, FLUID IS ALLOWED TO FLOW FROM THE SECOND PORT TO THE THIRD PORT, WHILE THE FIRST PORT AND THE FOURTH PORT ARE BLOCKED

704 — RECEIVING A FIRST ELECTRIC SIGNAL, ENERGIZING A SOLENOID COIL OF THE VALVE TO OPERATE THE VALVE IN A FIRST ACTUATED STATE, THEREBY CAUSING A MAIN SPOOL OF THE VALVE TO MOVE AXIALLY IN A PROXIMAL DIRECTION TO A FIRST AXIAL POSITION AND THROTTLE FLUID FLOW FROM THE SECOND PORT TO THE THIRD PORT, WHILE KEEPING THE FIRST PORT AND THE FOURTH PORT BLOCKED

706 — RECEIVING A SECOND ELECTRIC SIGNAL, ENERGIZING THE SOLENOID COIL OF THE VALVE TO OPERATE THE VALVE IN A SECOND ACTUATED STATE, THEREBY CAUSING THE MAIN SPOOL OF THE VALVE TO MOVE AXIALLY IN THE PROXIMAL DIRECTION TO A SECOND AXIAL POSITION, BLOCKING FLUID FLOW FROM THE SECOND PORT TO THE THIRD PORT, WHILE ALLOWING FLUID FLOW FROM THE FIRST PORT TO THE SECOND PORT AND FROM THE SECOND PORT TO THE FOURTH PORT

FIG. 7

FLOW CONTROL VALVE WITH LOAD-SENSE SIGNAL GENERATION

BACKGROUND

In conventional hydraulic systems, pressurized hydraulic fluid is supplied from a pump to a cylinder (actuator) and hydraulic fluid flows out of the actuator to a tank. The flow to the actuator and out of the actuator can be controlled by a spool valve. The position of a spool within the spool valve controls the flow of the hydraulic fluid. When the spool valve is actuated, the spool moves to a certain position and controls the flow of hydraulic fluid both to and from the actuator.

The construction of the four way spool valve is such that a given position of the spool determines the 'flow in' and the 'flow out' restriction sizes. Thus, metering-in and metering-out are coupled, and a certain restriction size on the inlet corresponds to a certain restriction size on the outlet. Therefore, the valve has one degree of freedom, and can control either the speed of the actuator or the pressure in one chamber of the actuator but not both. Thus, a spool valve can provide for speed control but it cannot achieve energy saving potential at the same time.

Further, in the case of an overrunning load, which occurs when lowering a load with gravity assistance, for example, a spool valve is designed such that the outlet restriction is used to control the flow so as to prevent the load from falling at uncontrollable speeds. However, in other operating conditions, such as lifting a load, this restriction is not needed yet it is inherent in the design of the spool valve and causes energy loss.

Further, some spool valves are actuated via a pilot fluid signal. Particularly, a pressure reducing valve is added to the system and is configured to receive fluid from a pump and reduce the pressure level of the fluid before providing the pilot signal fluid having the reduced pressure level to the spool valve to move the spool. Having such a pressure reducing valve can increase the cost of the hydraulic system.

It may thus be desirable to have a hydraulic system that replaces the spool valve with two independently-controlled meter-in valves. It may also be desirable to have a have that can operate without using a separate pressure-reducing valve as a source of pilot fluid signal. This way, the pressure reducing valve is eliminated from the system. It is with respect to these and other considerations that the disclosure made herein is presented.

SUMMARY

The present disclosure describes implementations that relate to a flow control valve with load-sense signal generation.

In a first example implementation, the present disclosure describes a valve. The valve includes: (i) a plurality of ports comprising: a first port configured to be fluidly coupled to a source of fluid, a second port configured to be fluidly coupled to an actuator, a third port configured to be fluidly coupled to a reservoir, and a fourth port configured to export a load-sense (LS) fluid signal from the valve; (ii) a main spool having a distal end configured to be subjected to a first fluid force applied by fluid from the first port, and a proximal end; and (iii) at least one spring configured to apply a biasing force on the main spool, wherein the at least one spring is disposed in a spring chamber, wherein the proximal end of the main spool is configured to be subjected to a second fluid force applied by fluid in the spring chamber, such that an axial position of the main spool is determined by a force balance between the first fluid force, the second fluid force, and the biasing force. The valve is configured to operate in one of three states: (i) a neutral state, wherein the main spool allows fluid flow from the second port to the third port, while the first port and the fourth port are blocked, (ii) a first actuated state, wherein the main spool moves to a first axial position and throttle fluid flow from the second port to the third port, while keeping the first port and the fourth port blocked, and (iii) a second actuated state, wherein the main spool moves to a second axial position blocking fluid flow from the second port to the third port, while allowing fluid flow from the first port to the second port and from the second port to the fourth port to export the LS fluid signal therefrom.

In a second example implementation, the present disclosure describes a hydraulic system including a load-sensing pump having a load-sense (LS) port and an outlet for providing fluid therefrom; a reservoir; an actuator; and a valve having a plurality of ports comprising: a first port configured to be fluidly coupled to the outlet of the load-sensing pump, a second port configured to be fluidly coupled to the actuator, a third port configured to be fluidly coupled to the reservoir, and a fourth port configured be fluidly coupled to the LS port of the load-sensing pump. The valve further comprises: (i) a main spool having a distal end configured to be subjected to a first fluid force applied by fluid from the first port, and a proximal end; and (ii) at least one spring configured to apply a biasing force on the main spool, wherein the at least one spring is disposed in a spring chamber, wherein the proximal end of the main spool is configured to be subjected to a second fluid force applied by fluid in the spring chamber, such that an axial position of the main spool is determined by a force balance between the first fluid force, the second fluid force, and the biasing force. The valve is configured to operate in one of three states: (i) a neutral state, wherein the main spool allows fluid flow from the actuator through the second port to the third port fluidly coupled to the reservoir, while the first port and the fourth port are blocked, (ii) a first actuated state, wherein the main spool moves to a first axial position and throttle fluid flow from the second port to the third port, while keeping the first port and the fourth port blocked, and (iii) a second actuated state, wherein the main spool moves to a second axial position blocking fluid flow from the second port to the third port, while allowing fluid flow from the load-sensing pump through the first port to the second port and the actuator fluidly coupled thereto, and from the second port to the fourth port to export an LS fluid signal therefrom to the LS port of the load-sensing pump.

In a third example implementation, the present disclosure describes a method. The method includes: (i) operating a valve in a neutral state, wherein the valve comprises a plurality of ports including: a first port configured to be fluidly coupled to a source of fluid, a second port configured to be fluidly coupled to an actuator, a third port configured to be fluidly coupled to a reservoir, and a fourth port configured to export a load-sense (LS) fluid signal from the valve, wherein when the valve is in the neutral state, fluid is allowed to flow from the second port to the third port, while the first port and the fourth port are blocked; (ii) receiving a first electric signal, energizing a solenoid coil of the valve to operate the valve in a first actuated state, thereby causing a main spool of the valve to move axially in a proximal direction to a first axial position and throttle fluid flow from the second port to the third port, while keeping the first port and the fourth port blocked; and (iii) receiving a second electric signal, energizing the solenoid coil of the valve to operate the valve in a second actuated state, thereby causing the main spool of the valve to move axially in the proximal direction to a second axial position, blocking fluid flow from the second port to the third port, while allowing fluid flow from the first port to the second port and from the second port to the fourth port.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 1 illustrates a cross-sectional side view of a valve in an unactuated state, in accordance with an example implementation.

FIG. 1A illustrates a cutting plane of the cross-sectional side view shown in FIG. 1, in accordance with an example implementation.

FIG. 7 is a flowchart of a method for operating a valve, in accordance with an example implementation.

DETAILED DESCRIPTION

Figure 2:
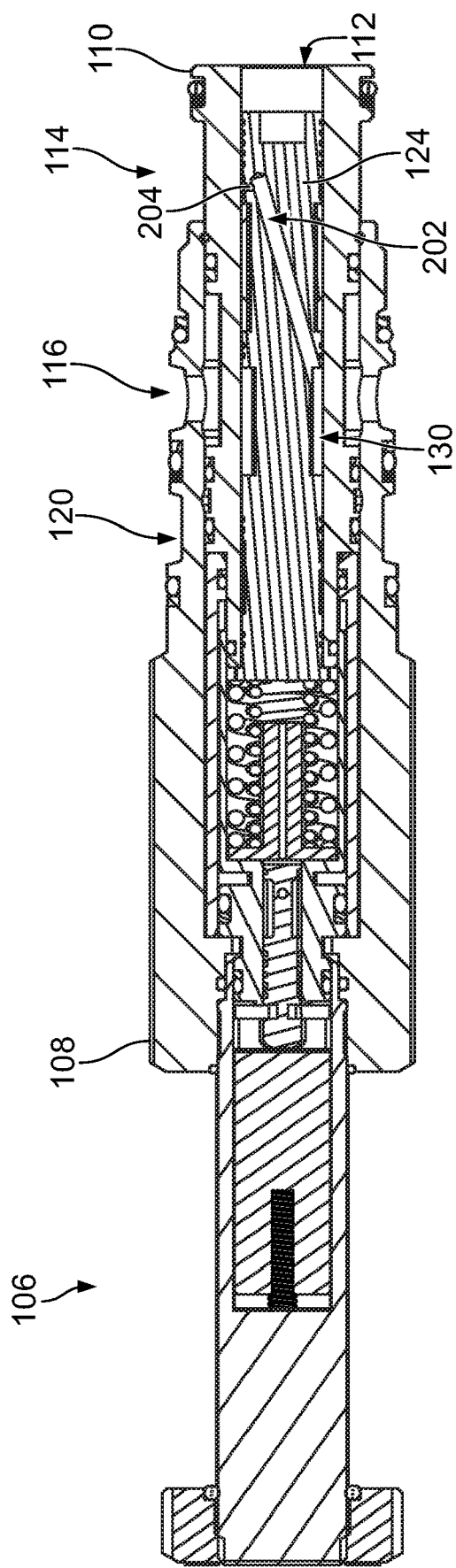
FIG. 2 illustrates a cross-sectional top view of the valve of FIG. 1 in an unactuated state, in accordance with an example implementation.

It may be desirable in hydraulic systems to independently control meter-in flow to an actuator and meter-out flow from the actuator. Independently controlling flow into and flow out of an actuator provides for a two degree of freedom system capable of controlling speed of the actuator as well as pressure in one of the chambers of the actuator, rendering the system capable of achieving a higher efficiency.

Further, in some conventional hydraulic systems where a spool valve is used to control both meter-in and meter-out flow, a pressure reducing valve is used in addition to the spool valve. The pressure reducing valve is configured to reduce pressure level of fluid received from a pump or other source of pressurized fluid, and then provides a pilot fluid signal to the spool valve to move a spool within the spool valve. The pressure reducing valve adds to the cost of the hydraulic system.

An actuator can have two chambers, each chamber having fluid at a respective pressure level. The higher pressure level of the respective pressure levels in the chambers can be indicative of the load that the actuator is subjected to. An example hydraulic system can include a load-sensing variable displacement pump as a source of fluid. The load-sensing variable displacement pump can be configured to receive a load-sense (LS) pressure signal indicative of the higher pressure level of the respective pressure levels in the chambers and provide a flow output that has a pressure level equal to the pressure level of the LS fluid signal plus a margin pressure setting so as to drive the actuator. In other words, output pressure level of the pump minus pressure level of the LS fluid signal is equal to the margin pressure setting. Particularly, the load-sensing variable displacement pump can be configured to add or subtract output flow to create the margin pressure setting in response to the pressure level of the LS fluid signal. It may be desirable to have a valve configured to internally generate the LS fluid signal so as to operate the pump, rather than having external hydraulic connections coupled to the chambers of the actuator and shuttle valves to provide the LS fluid signal to the pump.

Disclosed herein is a valve configured to control flow to and from an actuator. The disclosed valve can eliminate the pressure reducing valve used in conventional systems. Two such valves can be used to independently control flow to a first chamber of the actuator and flow discharged from a second chamber of the actuator. The disclosed valve can operate as meter-in or as a meter-out flow control valve based on direction of movement of the actuator. One of the valves can be operate in a neutral (unactuated) state or a first actuated state to control fluid flow from the actuator to a reservoir, while the other valve can operate in a second actuated state to control fluid flow from the pump to the actuator. The disclosed valve is further configured such that, when actuated in the second state, it generates an LS fluid signal to drive a load-sensing variable displacement pump.

FIG. 1 illustrates a cross-sectional side view of a valve 100 in an unactuated state, and FIG. 1A illustrates a cutting plane 101 of the cross-sectional side view shown in FIG. 1, in accordance with an example implementation. Particularly, FIG. 1A illustrates the cutting plane 101 when looking at a frontal or distal end of the valve 100.

The valve 100 may be inserted or screwed into a manifold having ports corresponding to ports of the valve 100 described below. The manifold can thus fluidly couple the valve 100 to other components of a hydraulic system.

The valve 100 includes a main stage 102, a pilot stage 104, and a solenoid actuator 106. The valve 100 includes a housing 108 having a longitudinal cylindrical cavity therein. The housing 108 can also be referred to as a valve body of the valve 100. The longitudinal cylindrical cavity of the housing 108 is configured to house and couple to portions of the main stage 102, the pilot stage 104, and the solenoid actuator 106.

In examples, the valve 100 can include a main sleeve 110 mounted to a distal end of the housing 108 within the longitudinal cylindrical cavity of the housing 108. The valve 100 includes a first port 112 defined at a nose or distal end of the main sleeve 110. The first port 112 can also be referred to as an inlet port and is configured to be fluidly coupled to a source of fluid (e.g., a pump or accumulator) that can supply fluid at a high pressure level, e.g., 5000 pounds per square inch (psi).

The valve 100 also includes a second port 114. The second port 114 can be referred to as operating or control port and is configured to be fluidly coupled to a chamber of an actuator to provide fluid thereto or receive fluid therefrom. The second port 114 can include a first actuator flow cross-hole 115A for providing fluid flow to the actuator coupled to the second port 114. The second port 114 can also include a second actuator flow cross-hole 115B for receiving fluid flow from the actuator coupled to the second port 114. The first actuator flow cross-hole 115A and the second actuator flow cross-hole 115B are longitudinally-spaced along a length of the main sleeve 110 and are isolated or fluidly decoupled from each other.

The term "cross-hole" is used herein to indicate a hole that crosses a path of, or is formed transverse relative to, another hole, cavity, or channel. Further, the term "fluidly decoupled" is used herein to indicate that no substantial fluid flow (e.g., except for minimal leakage flow of drops per minute) occurs between two fluid passages or openings that are fluidly decoupled. Conversely, the term "fluidly coupled" indicates that fluid can flow or be communicated between two fluid passages or openings. The term "block" is used herein to indicate substantially preventing fluid flow except for minimal or leakage flow of drops per minute, for example.

The valve 100 can further include a third port 116. The third port 116 can be referred to as tank or reservoir port and is configured to be coupled to a reservoir having low pressure fluid (e.g., fluid having atmospheric pressure level of pressure level less than 75 psi). The third port 116 can include a plurality of cross holes that can be referred to as reservoir cross-holes, such as reservoir cross-holes 117A, 117B, disposed in a radial or circumferential array about the housing 108. The main sleeve 110 includes a cross-hole 118 that is in fluid communication with the reservoir cross-holes 117A, 117B via annular space or annular chamber 119 formed between an exterior peripheral surface of the main sleeve 110 and an interior peripheral surface of the housing 108. Further, the reservoir cross-holes 117A, 117B are also in fluid communication with a longitudinal hole 113 formed in the main sleeve 110.

The valve 100 can further include a fourth port 120. The fourth port 120 can be referred to as a load-sense (LS) port and is configured to be coupled to a pump LS port of a load-sensing variable displacement pump, for example. The fourth port 120 can include a housing pilot cross-hole 121, which is fluidly coupled or in fluid communication with a sleeve pilot cross-hole 122 via annular groove 123 formed in the exterior peripheral surface of the main sleeve 110. As described below, the valve 100 is configured such that, when actuated to a particular actuated state, a pressure fluid signal is communicated from the second port 114 to the fourth port 120 so as to provide or export an LS fluid signal to a load-sensing variable displacement pump.

The valve 100 further includes a main spool 124 that is disposed, and slidably accommodated, in a respective longitudinal cylindrical cavity of the main sleeve 110. The term "slidably accommodated" is used throughout herein to indicate that a first component (e.g., the main spool 124) is positioned relative to a second component (e.g., the main sleeve 110) with sufficient clearance therebetween, enabling movement of the first component relative to the second component in the proximal and distal directions. As such, the first component (e.g., main spool 124) is not stationary, locked, or fixedly disposed in the valve 100, but is rather allowed to move relative to the second component (e.g., the main sleeve 110).

The main spool 124 also includes an annular shoulder or flanged proximal end 125. The flanged proximal end 125 of the main spool 124 is configured to interact or rests upon a proximal end of the main sleeve 110 when the main spool 124 is biased all the way in the distal direction as depicted in FIG. 1. In other words, the proximal end of the main sleeve 110 operates as a stop for the main spool 124 such that the main spool 124 might not move further in the distal direction than the axial position shown in FIG. 1.

Further, the main spool 124 includes a longitudinal hole or longitudinal channel 126 that is fluidly coupled to, and configured to communicated fluid received at, the first port 112. The main spool 124 also includes a cross-hole 127 that is fluid coupled to the longitudinal channel 126. With this configuration, fluid received at the first port 112 from the source of fluid (e.g., a pump) can be communicated through the longitudinal channel 126 and the cross-hole 127 to unsealed spaces between the exterior surface of the main spool 124 and the interior surface of the main sleeve 110. From such unsealed spaces, the fluid can then be communicated via cross-hole 128 to outside the main sleeve 110.

The main spool 124 further includes an annular groove 129. In the unactuated state depicted in FIG. 1, the annular groove 129 fluidly couples the second actuator flow cross-hole 115B of the second port 114 to the cross-hole 118. As mentioned above, the cross-hole 118 is in fluid communication with the reservoir cross-holes 117A, 117B via the annular chamber 119. With this configuration, in the neutral state, the second port 114 is fluidly coupled to the third port 116, and thus fluid exiting the actuator that is fluidly coupled to the second port 114 flows freely to the reservoir coupled to the third port 116.

The main spool 124 also includes an annular groove 130. In the unactuated state depicted in FIG. 1, the annular groove 130 is fluidly decoupled from the sleeve pilot cross-hole 122, i.e., there is no axial overlap between the annular groove 130 and the sleeve pilot cross-hole 122.

Figure 2A:
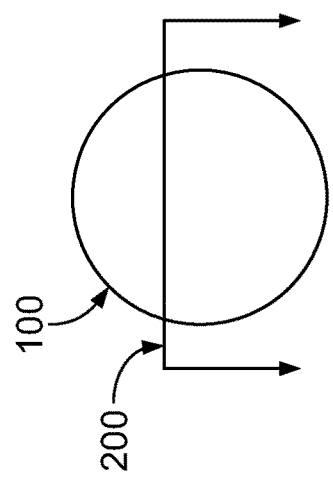
FIG. 2A illustrates a cutting plane of the cross-sectional top view shown in FIG. 2, in accordance with an example implementation.

FIG. 2 illustrates a cross-sectional top view of the valve 100 in an unactuated state, and FIG. 2A illustrates a cutting plane 200 of the cross-sectional top view shown in FIG. 2, in accordance with an example implementation. Particularly, FIG. 2A illustrates the cutting plane 200 when looking at a frontal or distal end of the valve 100. As shown in FIG. 2A, the cutting plane 200 is offset (e.g., by about 0.5 inch) from a center axis of the valve 100.

As depicted in the view of FIG. 2, the main spool 124 further includes a load-sense (LS) channel 202 and a cross-hole 204 connected, or fluidly coupled, to the LS channel 202. The LS channel 202 is slanted or diagonal as shown in FIG. 2. The cross-hole 204 is fluidly coupled to the second port 114. For example, the cross-hole 204 can be fluidly coupled to the second actuator flow cross-hole 115B, and thus fluidly couples the second actuator flow cross-hole 115B of the second port 114 to the LS channel 202.

Referring to FIGS. 1 and 2 together, the cross-hole 204 and the LS channel 202 fluidly couple the second port 114 to the annular groove 130. With this configuration, an LS fluid pressure signal indicative of pressure level of fluid provided to the actuator coupled to the second port 114 is also communicated to the annular groove 130. As described below, in particular actuated states of the valve 100, the fourth port 120 can be fluidly coupled to the annular groove 130 and can thus receive the LS fluid pressure signal, which can then be exported from the fourth port 120 to an external device (e.g., an LS pump).

Referring back to FIG. 1, the valve 100 can include another sleeve 132 fixedly disposed with the longitudinal cylindrical cavity of the housing 108. The valve 100 is configured such that there is an unsealed space between an exterior peripheral surface of the sleeve 132 and the interior peripheral surface of the housing 108 (e.g., the outer diameter of the sleeve 132 is slightly less than an inner diameter of the housing 108). This way, fluid can be communicated therebetween as described below. The sleeve 132 in turn has a longitudinal cylindrical cavity therein configured to include parts of the valve 100.

The pilot stage 104 can include a pilot sleeve 134 fixedly disposed within the housing 108. The pilot sleeve 134 can have a proximal sleeve portion 135 having a cavity in which a pilot spool 136 is slidably accommodated. The pilot sleeve 134 also has a distal sleeve portion 137 that appears as fork-shaped in the cross-sectional view of FIG. 1. The distal sleeve portion 137 has a spring chamber 139 therein in which a first spring 138 and a second spring 140 are disposed.

The pilot stage 104 further includes a spring guide 142 disposed in the spring chamber 139 within the distal sleeve portion 137. The spring guide 142 is fixed and has a flanged proximal end that rests against an interior surface of pilot sleeve 134. The spring guide 142 further has a longitudinal portion that operates as a guide for the spring 140. The spring guide 142 is hollow and has a channel 144 formed therein to communicate fluid therethrough.

The springs 138, 140 have proximal ends that are secured against the flanged proximal portion of the spring guide 142, whereas distal ends of the springs 138, 140 rest against a proximal end of the main spool 124. With this configuration, the springs 138, 140 apply a biasing force on the main spool 124 in the distal direction.

As shown in FIG. 1, the springs 138, 140 can have a nested spring configuration, where the spring 140 is disposed within the spring 138. This configuration may allow for applying a large biasing force on the main spool 124 if desired compared to having one spring. However, in other example implementations, one spring can be used. As such, at least one spring can be used.

The valve 100 is configured such that there is an unsealed space between an exterior peripheral surface of the distal sleeve portion 137 and the interior peripheral surface of the sleeve 132 (e.g., the outer diameter of the distal sleeve portion 137 is slightly less than an inner diameter of the sleeve 132). This way, fluid can be communicated therebetween to an annular groove 146 formed in the pilot sleeve 134. The pilot sleeve 134 further includes cross-hole 148 that fluidly couple the annular groove 146 to an annular groove 150 formed about the exterior surface of the pilot spool 136.

The pilot sleeve 134 further includes another set of cross-holes 151 axially-spaced from the cross-holes 148 along a length of the pilot sleeve 134. The cross-holes 151 are fluidly coupled to the third port 116 (the reservoir port) by way of unsealed space between the sleeve 132 and the housing 108, the longitudinal hole 113, and the reservoir cross-holes 117A, 117B.

The pilot spool 136 has a first or distal spool land 152 and a proximal spool land 154 separated by the annular groove 150. As shown in FIG. 1, in the neutral or unactuate state, the distal spool land 152 does not block the cross-holes 148, but rather allows for fluid flow from the cross-holes 148 to the annular groove 150.

The pilot spool 136 further includes cross-holes 153 and longitudinal channel 155. With this configuration, fluid in the annular groove 150 can flow through cross-holes 153 and longitudinal channel 155, then through the channel 144 of the spring guide 142 to the spring chamber 139. Thus, in this neutral state, the spring chamber 139 receives fluid having substantially the same pressure level of fluid received at the first port 112 (inlet fluid).

In the neutral or unactuate state shown in FIG. 1, the proximal spool land 154 blocks the cross-holes 151. The proximal spool land 154 thus blocks fluid flow from the annular groove 150 to the third port 116.

The solenoid actuator 106 includes a solenoid tube 156 configured as a cylindrical housing or body disposed within and coupled to a proximal end of the housing 108 (e.g., via a threaded engagement). A solenoid coil 158 can be disposed about an exterior surface of the solenoid tube 156. The solenoid coil 158 is retained between a proximal end of the housing 108 and a coil nut 157 having internal threads that can engage a threaded region formed on the exterior peripheral surface of the solenoid tube 156 at its proximal end.

The solenoid tube 156 further has a solenoid chamber within a distal portion of the solenoid tube 156. The solenoid tube 156 further includes a pole piece 159 composed of material of high magnetic permeability.

The solenoid tube 156 is configured to house a plunger or armature 160 in the solenoid chamber. The armature 160 is slidably accommodated within the solenoid tube 156 (i.e., the armature 160 can move axially within the solenoid tube 156). The pole piece 159 can be separated from the armature 160 by a gap 162.

The armature 160 includes a longitudinal channel 164 comprising an annular internal groove 166 formed in an interior peripheral surface of the armature 160. The annular internal groove 166 is formed as a recessed portion configured to receive and engage with an enlarged proximal end 168 of the pilot spool 136. With this configuration, the enlarged proximal end 168 of the pilot spool 136 interacts and engages with the armature 160, thereby causing the pilot spool 136 to be mechanically-coupled or linked to the armature 160. This way, axial motion of the armature 160 causes the pilot spool 136 to move therewith.

The valve 100 further includes an armature spring 169 that applies a biasing force on the armature 160 in the distal direction that can ensure axial contact between components of the valve 100 when the valve 100 is oriented vertically, for example. Further, the valve 100 is configured such that the solenoid chamber, within which the armature 160 is disposed, receives pressurized fluid from the first port 112.

Figure 3:
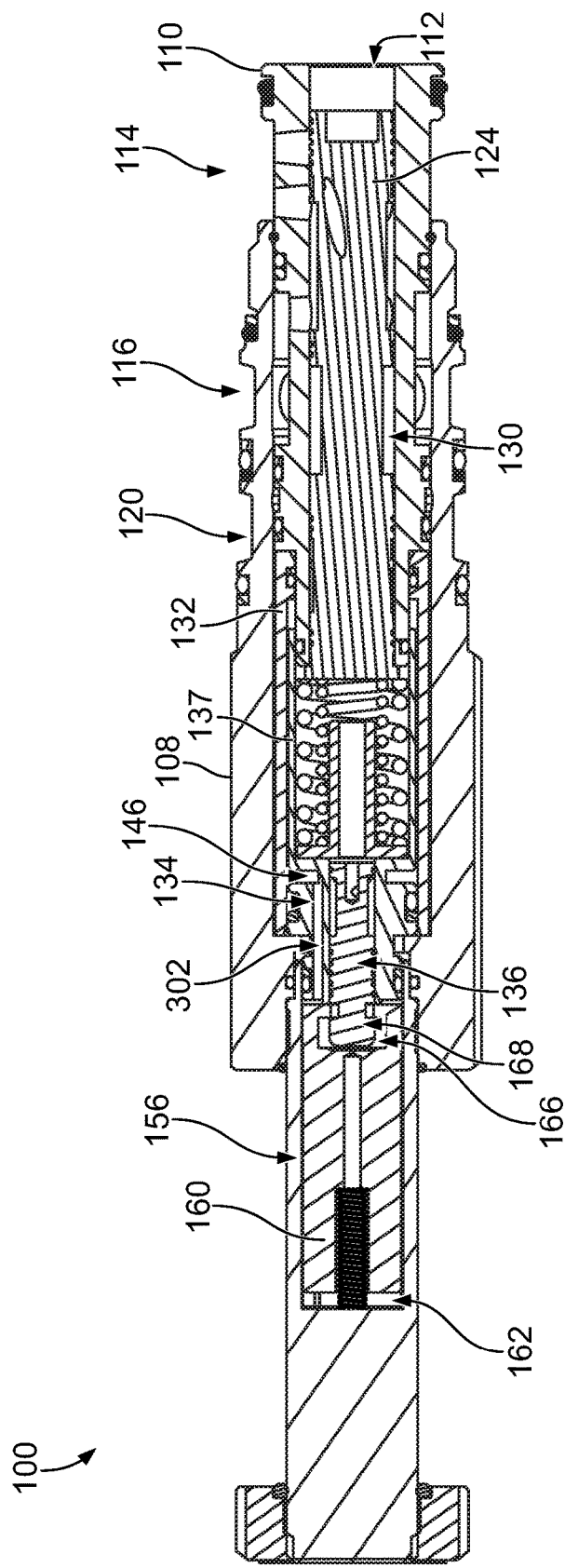
FIG. 3 illustrates a cross-sectional view of the valve of FIG. 1 in an unactuated state, in accordance with another example implementation.
Figure 3A:
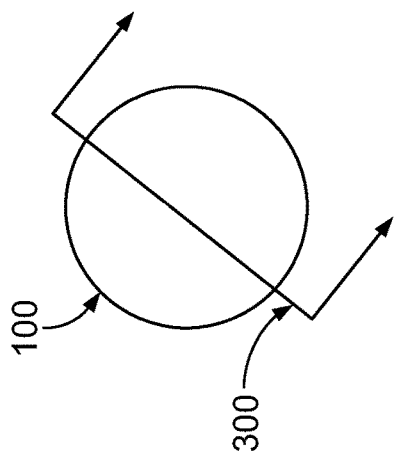
FIG. 3A illustrates a cutting plane of the cross-sectional view shown in FIG. 3, in accordance with another example implementation.

FIG. 3 illustrates a cross-sectional view of the valve 100 in an unactuated state, and FIG. 3A illustrates a cutting plane 300 of the cross-sectional view shown in FIG. 3, in accordance with an example implementation. Particularly, FIG. 3A illustrates the cutting plane 300 when looking at a frontal or distal end of the valve 100. As shown in FIG. 3A, the cutting plane 300 is diagonal or slanted relative to a center axis of the valve 100.

As mentioned above with reference to FIG. 1, fluid from the first port 112 can be communicated through the longitudinal channel 126, the cross-hole 127, the cross-hole 128, and the unsealed spaces between the distal sleeve portion 137 of the pilot sleeve 134 and the sleeve 132 to the annular groove 146 formed in the pilot sleeve 134. Referring to FIG. 3, the pilot sleeve 134 further includes a longitudinal channel or slot 302 that fluidly couples the annular groove 146 of the pilot sleeve 134 to the solenoid chamber in which the armature 160 is disposed.

With this configuration, the solenoid tube 156 receives pressurized fluid from the first port 112, and thus the solenoid tube 156 is filled with fluid having the same pressure level as pressure level at the first port 112. The pressurized fluid received from the first port 112 can provide lubrication and damping of motion of the armature 160 to reduce the likelihood of instability (e.g., oscillation of the armature 160). This contrasts with conventional valves where a solenoid tube is fluidly coupled to the tank port and thus pressure level therein can be low (e.g., atmospheric), thereby increasing the likelihood of instability.

Referring back to FIG. 1, the valve 100 can operate in at least three states or modes of operations. As mentioned above, in the neutral or unactuated state shown in FIGS. 1, 2, and 3 (i.e., when the solenoid coil 158 is un-energized), the second port 114 is fluidly coupled to the third port 116 via the second actuator flow cross-hole 115B, the annular groove 129, the cross-hole 118, the annular chamber 119, and the reservoir cross-holes 117A, 117B. In this state, fluid discharged from a chamber of the actuator coupled to the second port 114 flows freely (e.g., un-throttled or without substantial pressure drop) to the reservoir coupled to the third port 116.

In some cases, it may be desirable to throttle fluid discharged from the actuator. For example, during a state of overrunning load where the load coupled to the actuator is a negative load that acts with gravity (i.e., gravity-assisted), the actuator can move uncontrollably and the load can drop. In this case, it may be desirable to throttle fluid discharged from the actuator to control motion of the actuator and preclude the load from dropping.

The valve 100 is configured to operate in a first actuated state of operation where the valve 100 operates as a meter-out valve that throttles or meters fluid exiting the actuator to control its motion. This mode or state of operation corresponds to a first portion of a stroke of the main spool 124 wherein the main spool 124 moves from the neutral position in the proximal direction to restrict or throttle fluid flowing through the second actuator flow cross-hole 115B to the annular groove 129.

Figure 4:
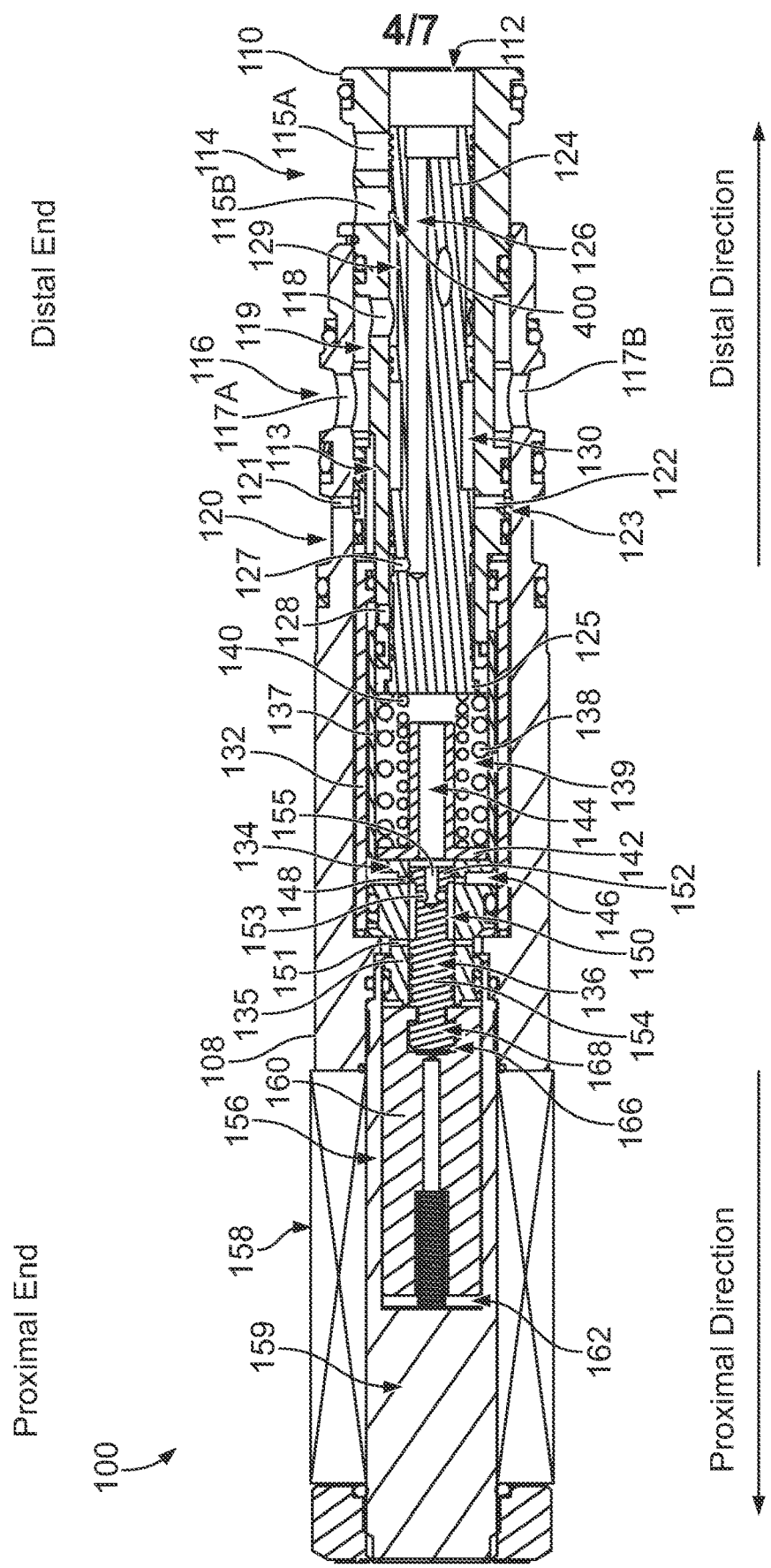
FIG. 4 illustrates a cross-sectional side view of the valve of FIG. 1 in a first actuated state, in accordance with an example implementation.

FIG. 4 illustrates a cross-sectional side view of the valve 100 in a first actuated state, in accordance with an example implementation. To actuate the valve 100, an electric command signal can be sent from a controller of a hydraulic system to the solenoid coil 158. When an electrical current is provided through the windings of the solenoid coil 158 to actuate the valve 100, a magnetic field is generated. The pole piece 159 directs the magnetic field through the gap 162 toward the armature 160, which is movable and is attracted toward the pole piece 159.

In other words, when an electrical current is applied to the solenoid coil 158, the generated magnetic field forms a north and south pole in the pole piece 159 and the armature 160, and therefore the pole piece 159 and the armature 160 are attracted to each other. Because the pole piece 159 is fixed and the armature 160 is movable, the armature 160 can traverse the gap 162 toward the pole piece 159, and the gap 162 is reduced. As such, a solenoid force is applied on the armature 160, where the solenoid force is a pulling force that tends to pull the armature 160 in the proximal direction. The solenoid force is proportional to a magnitude of the electrical command signal (e.g., magnitude of electrical current or voltage applied to the solenoid coil 158).

The solenoid force applied to the armature 160 is also applied to the pilot spool 136, which is coupled to the armature 160 as described above. As the pilot spool 136 moves in the proximal direction, the distal spool land 152 reduces a flow area from the cross-hole 148 to the annular groove 150. At the same time, the proximal spool land 154 can move past a distal edge of the cross-hole 151, thereby exposing the cross-hole 151 and allowing fluid flow from the annular groove 150 through the cross-hole 151.

As described above with respect to FIGS. 1-2, fluid received at the cross-hole 148 via the annular groove 146 is pressurized fluid from the first port 112 having a high pressure level, whereas the cross-hole 151 is fluidly coupled to the reservoir via the third port 116, and thus fluid at the cross-hole 151 has low pressure level. As such, as the proximal spool land 154 exposes the cross-hole 151 a pilot flow path is formed and pilot fluid flow is generated from the second port 114 to the third port 116. The pilot flow path includes: the longitudinal channel 126, the cross-hole 127, the cross-hole 128, the unsealed spaces between the pilot sleeve 134 and the sleeve 132, the annular groove 146, the cross-hole 148, the annular groove 150, the cross-hole 151, the unsealed space between the sleeve 132 and the housing 108, the longitudinal hole 113, and the reservoir cross-holes 117A, 117B. The pilot fluid flow can amount to about 0.25 gallons per minute (gpm) or less, for example.

The pilot fluid flow from the cross-hole 148 to the annular groove 150 causes a pressure drop in pressure level between fluid received at the cross-hole 148 and fluid in the annular groove 150 (due to the distal spool land 152 moving proximally and restricting the flow area from the cross-hole 148 to the annular groove 150). Similarly, the pilot fluid flow from the annular groove 150 to the cross-hole 151 causes a pressure drop in pressure level between fluid in the annular groove 150 and fluid flowing through the cross-hole 151 due to the proximal spool land 154 restricting the flow area from the annular groove 150 to the cross-hole 151.

As such, pressure fluid in the annular groove 150 is less than pressure fluid at the first port 112 (coupled to the source of fluid) and greater than pressure level of fluid at the third port 116 (coupled to the reservoir). For example, if fluid level at the first port 112 is 5000 psi, pressure level in the annular groove 150 can be about 4900 psi. As another example, if fluid level at the first port 112 is 3000 psi, pressure level in the annular groove 150 can be about 2900 psi. Moving the pilot spool 136 further in the proximal direction (i.e., by increasing magnitude of electric command provided to the solenoid coil 158) can further reduce pressure in the annular groove 150 (e.g., pressure level can be reduced further to about 4800 psi if pressure level at the first port 112 is 5000 psi).

Fluid in the annular groove 150 is communicated to the spring chamber 139 through the cross-hole 153 and the longitudinal channel 155 of the pilot spool 136. Thus, pressure level of fluid in the spring chamber 139 becomes less than pressure level of fluid at the first port 112. This way, fluid force applied by fluid in the spring chamber 139 acting in the distal direction on a proximal end of the main spool 124 becomes less than fluid force applied by fluid at the first port 112 acting in the proximal direction on the distal end of the main spool 124. As a result, the main spool 124 may start moving in the proximal direction to a different axial position.

The axial position of the main spool 124 in response to the command signal to the solenoid coil 158 is determined by or is based on a relationship (e.g., force equilibrium or force balance) between the various forces acting to the main spool 124. Particularly, the springs 138, 140 can be compressed until the force that they apply to the main spool 124 in the distal direction in addition to the fluid force of fluid in the spring chamber 139 also in the distal direction balance the fluid force applied to the main spool 124 in the proximal direction by fluid at the first port 112. The term "balances" is used herein to indicate that the forces acting on the main spool 124 in the proximal direction are equal in magnitude and opposite in direction relative to the forces acting on the main spool 124 in the distal direction.

Comparing FIG. 4 to FIG. 1, the main spool 124 has moved in the proximal direction as indicated by the flanged proximal end 125 being separated from the proximal end of the main sleeve 110 and the springs 138, 140 being compressed. Similar to the neutral state, in the first actuated state depicted in FIG. 4, fluid flows from the second port 114 through the second actuator flow cross-hole 115B to the annular groove 129, then through the annular chamber 119 and the reservoir cross-hole 117A, 117B of the third port 116 to the reservoir. However, in contrast to free flow in the neutral state, in the first actuated state fluid flow is restricted or throttled as fluid flows through flow area 400 formed between a distal edge of the annular groove 129 and proximal edge of the second actuator flow cross-hole 115B. The size of the flow area 400 is determined by the extent of motion and the axial position of the main spool 124.

As the command signal to the solenoid coil 158 increases, the solenoid force increases and the armature 160 as well as the pilot spool 136 move further in the proximal direction, thereby further reducing pressure level in the spring chamber 139. As the pressure level of fluid in the spring chamber 139 decreases, the fluid force that it applies to the main spool 124 in the distal direction decreases and the main spool 124 moves further in the proximal direction. As the main spool 124 moves further in the proximal direction, the springs 138, 140 are compressed further, and the force they apply on the main spool 124 in the distal direction increases until it balances the net fluid force acting on the main spool 124 in the proximal direction. Once such force balance or relationship between the forces is achieved, the main spool 124 stops at a position that is substantially proportional to the command signal to the solenoid coil 158.

As the main spool 124 moves further in the proximal direction, the flow area 400 is further restricted, thereby increasing throttling of fluid flowing from the second port 114 to the third port 116. As shown in FIG. 4, during this first actuated state, the actuator flow cross-hole 115A remains blocked by the main spool 124. The annular groove 130 also remains decoupled from the sleeve pilot cross-hole 122 and the fourth port 120, and thus no pilot fluid signal is provided thereto. The main spool 124 can remain in the first actuated state where fluid is being throttled from the second port 114 to the third port 116 until the main spool 124 reaches a particular axial position where it blocks the second actuator flow cross-hole 115B (i.e., when the distal edge of the annular groove 129 is aligned with or moves past the proximal edge of the second actuator flow cross-hole 115B in the proximal direction).

The stroke or axial motion of the main spool 124 from the neutral axial position to a position where the main spool 124 begins to block the second actuator flow cross-hole 115B can be referred to as a first portion of the stroke of the main spool 124 and can correspond to a range of magnitude of the electric command to the solenoid coil 158. For example, the first portion of the stroke of the main spool 124 can correspond to an electric command between 0% and a threshold command value, e.g., 50% of maximum voltage or current command.

Increasing the electric command beyond the threshold command value causes the valve 100 to operate in a second actuated state corresponding to a second portion of the stroke of the main spool 124. In the second actuated state (during the second portion of the stroke of the main spool 124), fluid is allowed to flow from the first port 112 to the second port 114, while providing an LS signal from the second port 114 to the fourth port 120 to be then exported externally from the fourth port 120. In this second actuated state, the valve 100 can operate as a meter-in valve to meter fluid flow from the source of fluid (e.g., the pump) to the actuator.

Figure 5:
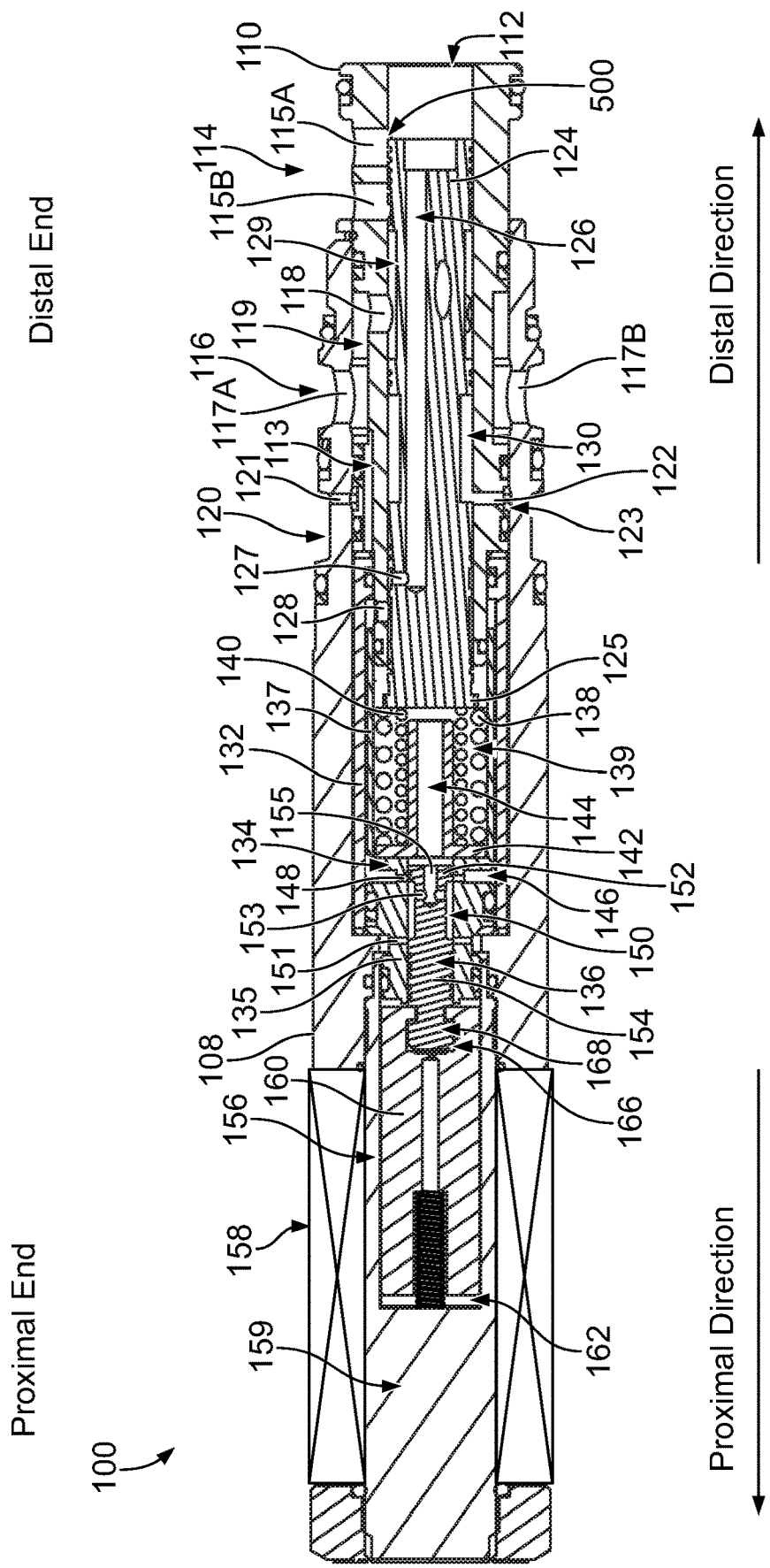
FIG. 5 illustrates a cross-sectional side view of the valve of FIG. 1 in a second actuated state, in accordance with an example implementation.

FIG. 5 illustrates a cross-sectional side view of the valve 100 in a second actuated state, in accordance with an example implementation. While the first actuated state depicted in FIG. 4 can correspond to a command signal that is between 0 and 50% of maximum voltage or current, the second actuated state depicted in FIG. 5 can correspond to a command signal that is between 50% and 100% of maximum voltage or current, for example. Commands between 50% and 100% of maximum voltage or current correspond to the second portion of the stroke of the main spool 124. These command percentages are examples for illustration only, and the valve can be configured with alternative command ranges.

As depicted in FIG. 5, the higher command signal causes the armature 160 and the pilot spool 136 coupled thereto to move further in the proximal direction. As a result, flow through the cross-hole 148 (which is fluidly coupled to the first port 112) is further restricted, whereas the flow through cross-hole 151 (which is fluidly coupled to the third port 116) is further opened. This causes the pressure level in the annular groove 150 to be reduced further compared to the inlet pressure level at the first port 112. Because the pressure level in the spring chamber 139 is substantially the same as the pressure level in the annular groove 150, the pressure level in the spring chamber 139 is also reduced.

As such, pressure level at the distal end of the main spool 124 remains at the inlet pressure level of the first port 112, whereas pressure level at its proximal end decreases. Thus, the net fluid force acting on the main spool 124 in the proximal direction increases and the main spool 124 can move further in the proximal direction. As a result, the springs 138, 140 are compressed until a new equilibrium position is reached.

As depicted in FIG. 5, further axial motion of the main spool 124 in the proximal direction causes the main spool 124 to block the second actuator flow cross-hole 115B. The main spool 124 can be configured such that as a distal edge of the annular groove 129 aligns with a proximal edge of the second actuator flow cross-hole 115B to start blocking the second actuator flow cross-hole 115B, a distal end of the main spool 124 may be aligned with a distal edge of the first actuator flow cross-hole 115A. As the main spool 124 moves further in the proximal direction, the first actuator flow cross-hole 115A is exposed and a flow area 500 is formed.

As such, a main flow path is formed through the flow area 500 where fluid is allowed to flow from the first port 112 (inlet port coupled to the source of fluid) to the second port 114 (coupled to the actuator). The flow through the flow area 500 can be referred to as the main flow. As an example for illustration, the main flow rate can amount to up to 25 GPM based on the axial position of the main spool 124. The 25 GPM main flow rate is an example for illustration only. The valve 100 is scalable in size and different amounts of main flow rates can be achieved. In this second actuated state, the valve 100 can operate as a meter-in valve where fluid flow is metered form the source of fluid across the flow area 500 to the actuator.

As mentioned above as an example for illustration, FIG. 4 illustrates the valve 100 in a first actuated state corresponding to a command between 0 and about 50% of maximum command, and FIG. 5 illustrates the valve 100 in a second actuated state corresponding to a command of between 50% and 100% of maximum command. As the command signal increases from 0% to 50%, fluid flow rate from actuator to the reservoir decreases proportionally until flow is blocked at a command of 50%, for example. Thereafter, increasing the command beyond 50% proportionally increases fluid flow rate from the source of fluid to the actuator.

Further, as depicted in FIG. 5, the main spool 124 can also be configured such that as a distal edge of the annular groove 129 aligns with a proximal edge of the second actuator flow cross-hole 115B to start blocking the second actuator flow cross-hole 115B, a proximal end of the annular groove 130 may be aligned with a distal edge of the sleeve pilot cross-hole 122. Referring to FIGS. 2 and 5 together, as the main spool 124 moves further in the proximal direction, the actuator flow cross-hole 115A is exposed as described above and additionally fluid is allowed to flow from the second port 114 through the cross-hole 204 and the LS channel 202 to the annular groove 130, then through the sleeve pilot cross-hole 122 and the housing pilot cross-hole 121 to the fourth port 120 (the LS port).

Thus, as the main flow path is formed, an LS path is also formed and a LS fluid signal is generated from the second port 114 to the fourth port 120 via the LS path. The LS path includes the LS channel 202, the annular groove 130, the sleeve pilot cross-hole 122, and the housing pilot cross-hole 121.

Because the second port 114 can be fluidly coupled to a chamber of the actuator, the pressurized fluid provided to the second port 114 and also provided through the LS path to the fourth port 120 has a pressure level substantially equal to the pressure level of the fluid in the chamber of the actuator. Such pressure level is induced by, and therefore can be indicative of, a load that the actuator is subjected to.

The fourth port 120 can be coupled to an LS port of a load-sensing pump so as to export the LS fluid signal thereto and allow the pump to provide a flow output that has a pressure equal to the pressure level of the LS fluid signal (the pressure level of fluid provided to the actuator from the second port 114) plus a margin pressure setting. The flow output of the load-sensing pump is provided to the first port 112 and can have a pressure level higher than the pressure level in the chamber of the actuator by the margin pressure setting so as to enable driving the actuator.

Notably, the LS fluid signal is provided to the fourth port 120 when the valve 100 operates in the second actuated state, i.e., when the valve 100 operates as a meter-in valve and meters fluid from the source of fluid to the actuator. An LS fluid signal is not provided to the fourth port 120 when the valve 100 is in the first actuated state, operating as a meter-out valve.

The configuration of the valve 100 offers several enhancements compared to conventional valve configurations. The pilot stage 104 is integrated within the valve 100, and thus a separate pilot valve is not needed, thereby reducing cost and complexity of the system. Further, the fluid provided to the first port 112 is both the main flow source and the pilot flow source. The main fluid flow proceeds from the first port 112 and then through the first actuator flow cross-hole 115A, whereas the pilot fluid flow proceeds also from the first port 112 through the pilot flow path described above. Thus, the configuration of valve 100 eliminates the need for an additional or separate pilot fluid source.

Further, the valve 100 is configured to internally generate a LS fluid signal that can be provided to drive a load-sensing pump. This configuration can save cost and enhance reliability because no external hydraulic connection is needed to tap into a hydraulic line connecting the second port 114 to the actuator. Rather, the LS fluid signal is generated internally within the valve 100 and provided to the pump.

As mentioned above, the valve 100 can operate as both a meter-in valve and a meter-out valve. Two valves similar to the valve 100 can be used to control an actuator in an independent metering configuration where one valve controls fluid flow to the actuator, and the other valve controls fluid discharged from the actuator. Independent control of fluid flowing to the actuator from fluid discharged from the actuator can also be advantageous as described below.

Figure 6:
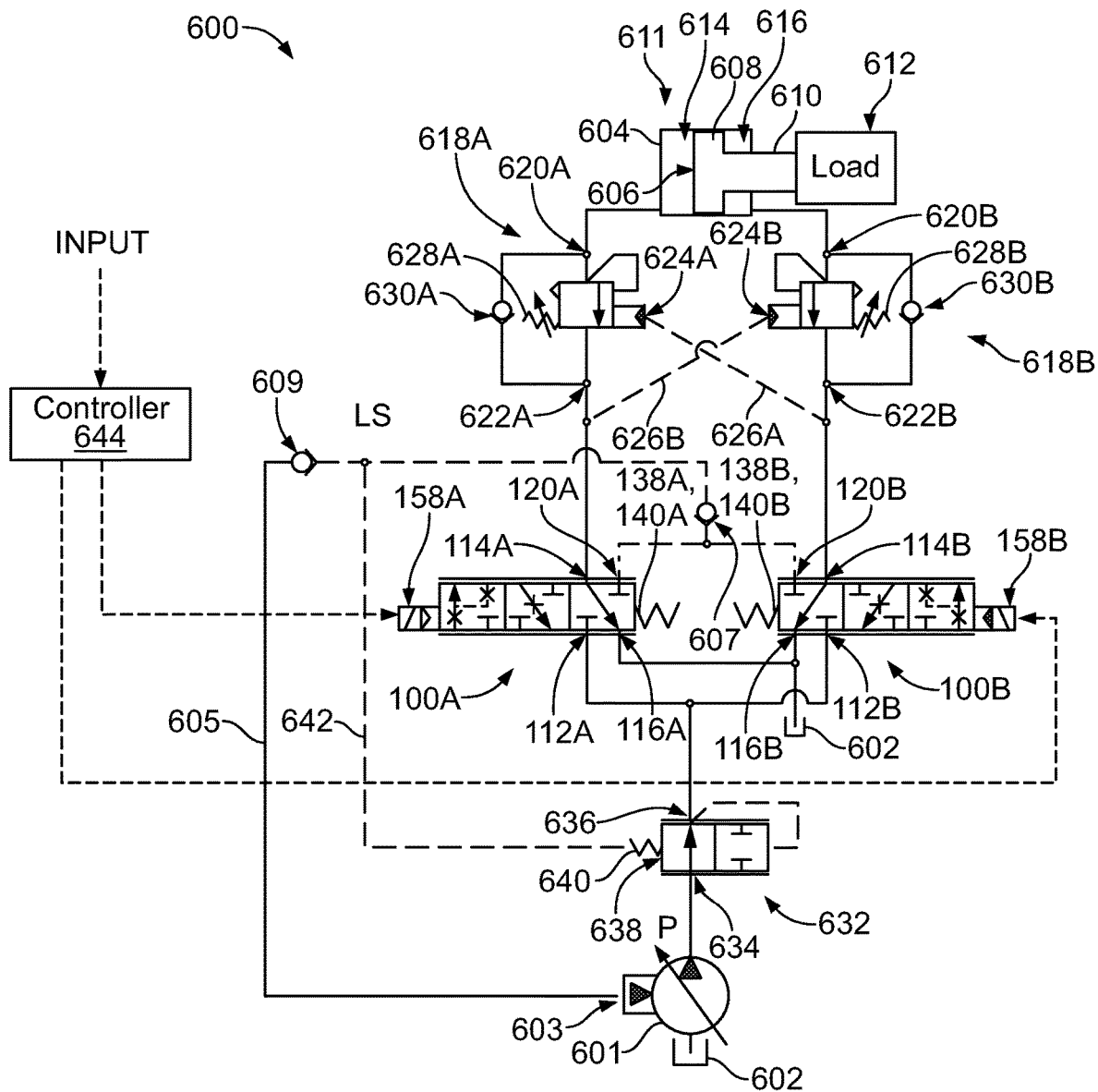
FIG. 6 illustrates a hydraulic system, in accordance with an example implementation.

FIG. 6 illustrates a hydraulic system 600, in accordance with an example implementation. The hydraulic system 600 includes two valves 100A, 100B that each symbolically represents the valve 100. The valves 100A, 100B have the same components of the valve 100. Therefore, the components or elements of the valves 100A, 100B are designated with the same reference numbers used for the valve 100 with an "A" or "B" suffix to correspond to the valves 100A, 100B respectively.

The hydraulic system 600 includes a source of fluid such as a load-sensing pump 601. The first ports 112A, 112B of the valves 100A, 100B, respectively, are fluidly coupled to an outlet of the load-sensing pump 601 such that the load-sensing pump 601 provides fluid flow to the first ports 112A, 112B.

The hydraulic system 600 also includes a reservoir or reservoir 602 of fluid that can store fluid at a low pressure (e.g., 0-70 psi). The third ports 116A, 116B of the valves 100A, 100B are respectively fluidly coupled to the reservoir 602. The reservoir 602 is depicted in two locations in FIG. 6 to reduce visual clutter in the drawing. However, it should be understood that in practice, a single reservoir can be configured to receive fluid discharged from the various hydraulic components (e.g., various valves) in the hydraulic system 600.

The load-sensing pump 601 can be configured to receive fluid from the reservoir 602, pressurize the fluid, and then provide pressurized fluid to the first ports 112A, 112B of the valves 100A, 100B. Pressure level of the fluid provided by the load-sensing pump 601 to the first ports 112A, 112B is based on pressure level of an LS fluid signal received at LS port 603 of the load-sensing pump 601. The LS fluid signal is received at the LS port 603 via LS hydraulic line 605, which is fluidly coupled via load-sense check valves 607, 609 to the fourth ports 120A, 120B of the valves 100A, 100B. The load-sensing pump 601 provides a flow output to the first ports 112A, 112B, with the flow output having a pressure level equal to the pressure level of the LS fluid signal plus a margin pressure setting.

The valves 100A, 100B are configured as meter-in and meter-out valves configured to control fluid flow to and from an actuator 611. The actuator 611 includes a cylinder 604 and an actuator piston 606 slidably accommodated in the cylinder 604. The actuator piston 606 includes a piston head 608 and a rod 610 extending from the piston head 608 along a central longitudinal axis direction of the cylinder 604. The rod 610 is coupled to a load 612. The load 612 is depicted as a block and represents any type of load that the actuator 611 can be subjected to.

The piston head 608 divides the inner space of the cylinder 604 into a first chamber 614 and a second chamber 616. The second port 114A of the valve 100A can be fluidly coupled to the first chamber 614, whereas the second port 114B of the valve 100B can be fluidly coupled to the second chamber 616.

In examples, the hydraulic system 600 can include counterbalance valves 618A, 618B configured to hold the load 612 in place and preclude leakage from the chambers 614, 616 to the reservoir 602. The counterbalance valves 618A, 618B have the same components, and thus their components or elements are designated with the same reference numbers with an "A" or "B" suffix to correspond to the counterbalance valves 618A, 618B, respectively.

The counterbalance valve 618A can have a load port 620A fluidly coupled to the first chamber 614, a port 622A fluidly coupled to the second port 114A of the valve 100, and a pilot port 624A. A pilot line 626A is tapped from the fluid line that fluidly couples the second port 114B of the valve 100B to the port 622B of the counterbalance valve 618B. The pilot line 626A is fluidly coupled to the pilot port 624A of the counterbalance valve 618A.

The counterbalance valve 618A has a setting spring 628A. The counterbalance valve 618A can be configured such that a pilot pressure fluid signal received through the pilot line 626A at the pilot port 624A acts together with the pressure induced in the first chamber 614 due to the load 612 against a force of the setting spring 628A. The combined action of the pilot pressure fluid signal and the induced pressure in the first chamber 614 facilitates opening the counterbalance valve 618A and allowing flow therethrough from the load port 620A to the port 622A.

The counterbalance valve 618A can further include a check valve 630A. The check valve 630A can allow free flow (e.g., flow causing minimal pressure drop across the check valve 630A) from the port 622A to the load port 620A. The counterbalance valve 618B is configured to operate similar to the counterbalance valve 618A.

In examples, the hydraulic system 600 can include a pressure compensator valve 632. The pressure compensator valve 632 can include an inlet port 634 configured to receive fluid flow from the load-sensing pump 601 and can include an outlet port 636 configured to provide fluid to the first ports 112A, 112B of the valves 100A, 100B. The pressure compensator valve 632 can also include a load-sense (LS) port 638 configured to receive an LS signal. The pressure compensator valve 632 can further include a spring 640 configured to apply a particular force or pressure on a pressure compensation spool within the pressure compensator valve 632.

As mentioned above, advantageously, the valves 100A, 100B can provide an LS fluid signal when operating in the second actuated state as meter-in valves. Thus, an LS fluid signal indicative of fluid pressure in either of the chambers 614, 616 (that is receiving fluid from the load-sensing pump 601) is generated and provided to a valve LS fluid line 642. The LS pressure signal from the valve LS fluid line 642 is then provided to the LS port 638 of the pressure compensator valve 632.

With this configuration, the pressure compensator valve 632 can sense the pressure level at the inlet port 634 and the pressure level of the LS pressure signal at the LS port 638. Responsively, the pressure compensation spool moves in the fluid path from the inlet port 634 to the outlet port 636 so as to provide fluid at the outlet port 636 at a pressure level that is higher than the pressure level of the LS pressure signal by a value of the pressure that the spring 640 applies to the pressure compensation spool (e.g., 200 psi). In other words, the pressure compensator valve 632 can be configured to maintain a particular pressure drop or pressure differential across the valve 100A or the valve 100B, whichever valve is being operated as a meter-in valve.

The hydraulic system 600 can include a controller 644. The controller 644 can include one or more processors or microprocessors and may include data storage (e.g., memory, transitory computer-readable medium, non-transitory computer-readable medium, etc.). The data storage may have stored thereon instructions that, when executed by the one or more processors of the controller 644, cause the controller 644 to perform operations described herein. Signal lines to and from the controller 644 are depicted as dashed lines in FIG. 6. The controller 644 can receive input or input information comprising sensor information via signals from various sensors or input devices in the hydraulic system 600, and in response provide electrical signals to various components of the hydraulic system 600 such as the solenoid coils 158A, 158B and the load-sensing pump 601.

For example, the controller 644 can receive a command or input information requesting extending the actuator piston 606. The controller 644 can operate the valve 100A as a meter-in valve and operate the valve 100B as a meter-out valve. Particularly, the controller 644 can operate the valve 100A in the second actuated state described above with respect to FIG. 5 (e.g., provide a command signal between 50% and 100% of the maximum command to the solenoid coil 158A). This way, fluid is provided from the first port 112A to the second port 114A, then to the first chamber 614 to extend the actuator piston 606.

At the same time, an LS fluid signal indicative of the pressure level in the first chamber 614 (and thus indicative of the load 612) is provided via the fourth port 120A and the LS hydraulic line 605 to the LS port 603 of the load-sensing pump 601. The load-sensing pump 601 then provides fluid flow to the first port 112A, where the pressure level of the fluid is equal to the pressure level of the LS fluid signal plus the margin pressure setting.

As the actuator piston 606 extends, fluid is forced out of the second chamber 616. A pilot pressure fluid signal received through the pilot line 626B acts together with the pressure induced in the second chamber 616 due to the load 612, against a force generated by the setting spring 628B of the counterbalance valve 618B, causing fluid to flow from the load port 620B to the port 622B, then to the second port 114B of the valve 100B.

The controller 644 can operate the valve 100B in either a neutral/unactuated state (see FIGS. 1-3) or in the first actuated state (e.g., the state shown in FIG. 4) where fluid is allowed to flow from the second port 114B to the third port 116B, then to the reservoir 602. Selecting whether to operate the valve 100B in the neutral/unactuated or the first actuated state is based on the load 612.

Particularly, if the load 612 is resistive, then it may be desirable to operate the valve 100B in the neutral state to allow free flow therethrough with minimal pressure drop thereacross. Beneficially, the reduced or minimized pressure drop through the valve 100B can reduce power consumption in the hydraulic system 600. On the other hand, if the load 612 is overrunning (gravity-assisted), it may be desirable to operate the valve 100B in the first actuated state (FIG. 4) to meter or throttle fluid flow thereacross to controllably lower the load 612.

The configuration of FIG. 6 offers several enhancements over conventional hydraulic systems having a spool valve controlled by a pressure reducing valve. The construction of the spool valve is such that a given position of the spool determines the meter-in and meter-out restriction sizes at the same time. Thus, metering-in and metering-out are coupled and the valve has one degree of freedom, and can control can control either the speed of the actuator piston 606 or the pressure in just one of the chambers 614, 616 but not both. Thus, it can provide for speed control but it cannot achieve efficient operation at the same time.

Further, in the case of an overrunning load, which happens when lowering the load 612 with gravity assistance, for example, spool valves are designed such that the outlet restriction is used to control the flow so as to prevent the load from falling at uncontrollable speeds. However, in other operating conditions, such as lifting the load 612, this restriction is not needed yet it is inherent in the design of the spool valve and causes energy loss.

With the configuration of FIG. 6, however, the meter-out fluid flows through the valve 100B which is independently controlled from the valve 100A. The valve 100B can be in an unactuated state, and thus remains fully open from the second port 114B to the third port 116B regardless of the command signal provided to the valve 100A.

Further, because the valve 100B is unactuated or is in the first actuated state, no LS fluid signal is provided to the fourth port 120B of the valve 100B; rather, the LS fluid signal is provided from the fourth port 120A of the valve 100A, which is in the second actuated state. This way, in the case of an overrunning load where pressure level in the second chamber 616 is higher than the pressure level in the first chamber 614, the load-sensing pump 601 provides fluid flow to the first port 112A with a reduced pressure level that is sufficient to drive lower the load 612 without consuming the higher power that would have been required if the LS fluid signal is provided from the valve 100B, indicating pressure level in the second chamber 616.

To retract the actuator piston 606, operation of the valves 100A, 100B is reversed such that the valve 100B operates in the second actuated state as a meter-in valve, whereas the valve 100A operates in the neutral/unactuated state or the first actuated state as a meter-out valve.

FIG. 7 is a flowchart of a method 700 for operating a valve, in accordance with an example implementation. The method 700 shown in FIG. 7 presents an example of a method that can be used with the valve 100 shown throughout the Figures, for example. The method 700 may include one or more operations, functions, or actions as illustrated by one or more of blocks 702-706. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 702, the method 700 includes operating the valve 100 in the neutral state (see FIGS. 1-3), wherein the valve 100 comprises a plurality of ports including: the first port 112 configured to be fluidly coupled to a source of fluid (e.g., the load-sensing pump 601), the second port 114 configured to be fluidly coupled to an actuator (e.g., the actuator 611), the third port 116 configured to be fluidly coupled to the reservoir 602, and the fourth port 120 configured to export a load-sense fluid signal from the valve 100, wherein when the valve 100 is in the neutral state, fluid is allowed to flow from the second port 114 to the third port 116, while the first port 112 and the fourth port 120 are blocked.

At block 704, the method 700 includes receiving a first electric signal, energizing the solenoid coil 158 of the valve 100 to operate the valve 100 in a first actuated state (see FIG. 4), thereby causing the main spool 124 of the valve 100 to move axially in a proximal direction to a first axial position and throttle fluid flow from the second port 114 to the third port 116, while keeping the first port 112 and the fourth port 120 blocked.

At block 706, the method 700 includes receiving a second electric signal, energizing the solenoid coil 158 of the valve 100 to operate the valve in a second actuated state (see FIG. 5), thereby causing the main spool 124 of the valve 100 to move axially in the proximal direction to a second axial position, blocking fluid flow from the second port 114 to the third port 116, while allowing fluid flow from the first port 112 to the second port 114 and from the second port 114 to the fourth port 120.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
a plurality of ports comprising: (i) a first port configured to be fluidly coupled to a source of fluid, (ii) a second port configured to be fluidly coupled to an actuator, (iii) a third port configured to be fluidly coupled to a reservoir, and (iv) a fourth port configured to export a load-sense (LS) fluid signal from the valve;
a main spool having (i) a distal end subjected to a first fluid force applied by fluid from the first port, and (ii) a proximal end; and
at least one spring configured to apply a biasing force on the main spool, wherein the at least one spring is disposed in a spring chamber, wherein the proximal end of the main spool is configured to be subjected to a second fluid force applied by fluid in the spring chamber, such that an axial position of the main spool is determined by a force balance between the first fluid force, the second fluid force, and the biasing force,
wherein the valve is configured to operate in three states: (i) a neutral state, wherein the main spool allows fluid flow from the second port to the third port, while the first port and the fourth port are blocked, (ii) a first actuated state, wherein the main spool moves to a first axial position and throttle fluid flow from the second port to the third port, while keeping the first port and the fourth port blocked, and (iii) a second actuated state, wherein the main spool moves to a second axial position blocking fluid flow from the second port to the third port, while allowing fluid flow from the first port to the second port and from the second port to the fourth port to export the LS fluid signal therefrom.

2. The valve of claim 1, further comprising:
a pilot spool configured to control pilot fluid flow from the first port to the third port, thereby controlling pressure level of fluid in the spring chamber and the force balance that determines the axial position of the main spool.

3. The valve of claim 2, further comprising:
a solenoid actuator comprising a solenoid coil and an armature that is mechanically-coupled to the pilot spool, wherein: (i) in the neutral state, the solenoid coil is un-energized, (ii) in the first actuated state, the solenoid coil is energized, thereby moving the armature and the pilot spool and causing the pressure level of fluid in the spring chamber to decrease, causing the main spool to move to the first axial position, and (iii) in the second actuated state, the solenoid coil is energized, thereby moving the armature and the pilot spool and causing the pressure level of fluid in the spring chamber to further decrease, causing the main spool to move to the second axial position.

4. The valve of claim 2, wherein the pilot spool comprises a first spool land, a second spool land, and an annular groove formed therebetween, wherein the spring chamber is fluidly coupled to the annular groove, wherein the first spool land controls fluid flow from the first port to the annular groove, and wherein the second spool land controls fluid flow from the annular groove to the third port.

5. The valve of claim 2, further comprising:
a pilot sleeve comprising: (i) a proximal sleeve portion forming a cavity in which the pilot spool is slidably accommodated, and a (ii) a distal sleeve portion forming the spring chamber in which the at least one spring is disposed.

6. The valve of claim 1, further comprising:
a main sleeve having a longitudinal cylindrical cavity in which the main spool is slidably accommodated, wherein the main sleeve comprises (i) a first actuator flow cross-hole through which fluid flows from the first port to the second port, and (ii) a second actuator flow cross-hole through which fluid flows from the second port to the third port.

7. The valve of claim 6, wherein: (i) in the neutral state, the main spool blocks the first actuator flow cross-hole and allows fluid to flow freely from the second actuator flow cross-hole to the third port, (ii) in the first actuated state, the main spool restricts fluid flow from the second actuator flow cross-hole to the third port, while keeping the first actuator flow cross-hole blocked, and (iii) in the second actuated state, the main spool exposes the first actuator flow cross-hole to allow fluid flow from the first port to the second port, while blocking the second actuator flow cross-hole.

8. The valve of claim 6, further comprising:
a housing having a respective longitudinal cylindrical cavity in which the main sleeve is disposed, wherein the housing comprises the third port and the fourth port, wherein the main sleeve comprises the first port and the second port.

9. The valve of claim 1, wherein the main spool comprises a load-sense channel configured to fluidly couple the second port to an annular groove in the main spool, wherein in the neutral state and the first actuated state, the annular groove is fluidly decoupled from the fourth port, and wherein in the second actuated state, the annular groove is fluidly coupled to the fourth port such that the LS fluid signal is provided from the second port through the load-sense channel to the annular groove, then to the fourth port.

10. A hydraulic system comprising:
a load-sensing pump having a load-sense (LS) port and an outlet for providing fluid therefrom;
a reservoir;
an actuator; and
a valve having a plurality of ports comprising: (i) a first port configured to be fluidly coupled to the outlet of the load-sensing pump, (ii) a second port configured to be fluidly coupled to the actuator, (iii) a third port configured to be fluidly coupled to the reservoir, and (iv) a fourth port configured be fluidly coupled to the LS port of the load-sensing pump, wherein the valve further comprises:
a main spool having (i) a distal end subjected to a first fluid force applied by fluid from the first port, and (ii) a proximal end, and
at least one spring configured to apply a biasing force on the main spool, wherein the at least one spring is disposed in a spring chamber, wherein the proximal end of the main spool is configured to be subjected to a second fluid force applied by fluid in the spring chamber, such that an axial position of the main spool is determined by a force balance between the first fluid force, the second fluid force, and the biasing force, wherein the valve is configured to operate in three states: (i) a neutral state, wherein the main spool allows fluid flow from the actuator through the second port to the third port fluidly coupled to the reservoir, while the first port and the fourth port are blocked, (ii) a first actuated state, wherein the main spool moves to a first axial position and throttle fluid flow from the second port to the third port, while keeping the first port and the fourth port blocked, and (iii) a second actuated state, wherein the main spool moves to a second axial position blocking fluid flow from the second port to the third port, while allowing fluid flow from the load-sensing pump through the first port to the second port and the actuator fluidly coupled thereto, and from the second port to the fourth port to export an LS fluid signal therefrom to the LS port of the load-sensing pump.

11. The hydraulic system of claim 10, wherein the valve further comprises:
a pilot spool configured to control pilot fluid flow from the first port to the third port, thereby controlling pressure level of fluid in the spring chamber and the force balance that determines the axial position of the main spool.

12. The hydraulic system of claim 11, wherein the valve further comprises:
a solenoid actuator comprising a solenoid coil and an armature that is mechanically-coupled to the pilot spool, wherein: (i) in the neutral state, the solenoid coil is un-energized, (ii) in the first actuated state, the solenoid coil is energized, thereby moving the armature and the pilot spool and causing the pressure level of fluid in the spring chamber to decrease, causing the main spool to move to the first axial position, and (iii) in the second actuated state, the solenoid coil is energized, thereby moving the armature and the pilot spool and causing the pressure level of fluid in the spring chamber to further decrease, causing the main spool to move to the second axial position.

13. The hydraulic system of claim 11, wherein the pilot spool comprises a first spool land, a second spool land, and an annular groove formed therebetween, wherein the spring chamber is fluidly coupled to the annular groove, wherein the first spool land controls fluid flow from the first port to the annular groove, and wherein the second spool land controls fluid flow from the annular groove to the third port.

14. The hydraulic system of claim 11, wherein the valve further comprises:
a pilot sleeve comprising: (i) a proximal sleeve portion forming a cavity in which the pilot spool is slidably accommodated, and a (ii) a distal sleeve portion forming the spring chamber in which the at least one spring is disposed.

15. The hydraulic system of claim 10, wherein the valve further comprises:
a main sleeve having a longitudinal cylindrical cavity in which the main spool is slidably accommodated, wherein the main sleeve comprises (i) a first actuator flow cross-hole through which fluid flows from the first port to the second port, and (ii) a second actuator flow cross-hole through which fluid flows from the second port to the third port.

16. The hydraulic system of claim 15, wherein: (i) in the neutral state, the main spool blocks the first actuator flow cross-hole and allows fluid to flow freely from the second actuator flow cross-hole to the third port, (ii) in the first actuated state, the main spool restricts fluid flow from the second actuator flow cross-hole to the third port, while keeping the first actuator flow cross-hole blocked, and (iii) in the second actuated state, the main spool exposes the first actuator flow cross-hole to allow fluid flow from the first port to the second port, while blocking the second actuator flow cross-hole.

17. The hydraulic system of claim 15, wherein the valve further comprises:
a housing having a respective longitudinal cylindrical cavity in which the main sleeve is disposed, wherein the housing comprises the third port and the fourth port, wherein the main sleeve comprises the first port and the second port.

18. The hydraulic system of claim 10, wherein the main spool comprises a load-sense channel configured to fluidly couple the second port to an annular groove in the main spool, wherein in the neutral state and the first actuated state, the annular groove is fluidly decoupled from the fourth port, and wherein in the second actuated state, the annular groove is fluidly coupled to the fourth port such that the LS fluid signal is provided from the second port through the load-sense channel to the annular groove, then to the fourth port and the LS port of the load-sensing pump.

19. A method comprising:
operating a valve in a neutral state, wherein the valve comprises a plurality of ports including: a first port configured to be fluidly coupled to a source of fluid, a second port configured to be fluidly coupled to an actuator, a third port configured to be fluidly coupled to a reservoir, and a fourth port configured to export a load-sense (LS) fluid signal from the valve, wherein when the valve is in the neutral state, fluid is allowed to flow from the second port to the third port, while the first port and the fourth port are blocked;
receiving a first electric signal, energizing a solenoid coil of the valve to operate the valve in a first actuated state, thereby causing a main spool of the valve to move axially in a proximal direction to a first axial position and throttle fluid flow from the second port to the third port, while keeping the first port and the fourth port blocked; and
receiving a second electric signal, energizing the solenoid coil of the valve to operate the valve in a second actuated state, thereby causing the main spool of the valve to move axially in the proximal direction to a second axial position, blocking fluid flow from the second port to the third port, while allowing fluid flow from the first port to the second port and from the second port to the fourth port, wherein the main spool has (i) a distal end subjected to a first fluid force applied by fluid from the first port, and (ii) a proximal end subjected to a second fluid force applied by fluid in a spring chamber, wherein the valve further comprises: (i) at least one spring disposed in the spring chamber and configured to apply a biasing force on the main spool, such that an axial position of the main spool is determined by a force balance between the first fluid force, the second fluid force, and the biasing force.

20. The method of claim 19, wherein the valve further comprises (i) a pilot spool configured to control pilot fluid flow from the first port to the third port, thereby controlling pressure level of fluid in the spring chamber and the force balance that determines the axial position of the main spool, and (ii) an armature that is mechanically-coupled to the pilot spool, wherein operating the valve in the first actuated state or the second actuated state comprises:
moving the armature and the pilot spool coupled thereto, thereby causing the pressure level of fluid in the spring chamber to decrease, causing the main spool to move to the first axial position or the second axial position.

* * * * *